US012542127B2

United States Patent
Lovelace et al.

(10) Patent No.: US 12,542,127 B2
(45) Date of Patent: Feb. 3, 2026

(54) TEXT-TO-AUDIO CONVERSION WITH BYTE-ENCODING VECTORS

(71) Applicant: ASAPP, INC., New York, NY (US)

(72) Inventors: Justin Robert Lovelace, Ithaca, NY (US); Soham Ray, Ithaca, NY (US); Felix Wu, Issaquah, WA (US); Kilian Quirin Weinberger, Ithaca, NY (US); Kwangyoun Kim, San Jose, CA (US)

(73) Assignee: ASAPP, INC., New York, NY (US)

( * ) Notice: Subject to any disclaimer, the term of this patent is extended or adjusted under 35 U.S.C. 154(b) by 221 days.

(21) Appl. No.: 18/407,083

(22) Filed: Jan. 8, 2024

(65) Prior Publication Data

US 2025/0104692 A1   Mar. 27, 2025

Related U.S. Application Data

(60) Provisional application No. 63/539,692, filed on Sep. 21, 2023.

(51) Int. Cl.
  *G10L 13/08*   (2013.01)
  *G06N 3/02*    (2006.01)
(52) U.S. Cl.
  CPC .............. *G10L 13/08* (2013.01); *G06N 3/02* (2013.01)
(58) Field of Classification Search
  CPC .......... G10L 13/08; G06N 3/02; G06N 3/045
  See application file for complete search history.

(56) References Cited

U.S. PATENT DOCUMENTS

| | | | | |
|---|---|---|---|---|
| 11,934,935 | B2 * | 3/2024 | van den Oord | G06N 3/088 |
| 12,073,819 | B2 * | 8/2024 | Salimans | G10L 25/30 |

OTHER PUBLICATIONS

Borsos, ZALáN , et al., "AudioLM: A Language Modeling Approach to Audio Generation", IEEE/ACM Transactions on Audio, Speech, and Language Processing, vol. 31, Jun. 21, 2023, pp. 2523-2533.
Brown, Tom B., et al., "Language Models are Few-Shot Learners", Advances in Neural Information Processing Systems (NeurIPS), 33, 2020, pp. 1877-1901.
Casanova, Edresson , et al., "YourTTS: Towards Zero-Shot Multi-Speaker TTS and Zero-Shot Voice Conversion for Everyone", Proceedings of the 39th International Conference on Machine Learning, PMLR 162, Baltimore, Maryland, USA, 2022, pp. 2709-2720.
Chen, Shoufa , et al., "DiffusionDet: Diffusion Model for Object Detection", arXiv, arXiv:2211.09788v2 [cs.CV], https://arxiv.org/pdf/2211.09788, (accessed on Oct. 21, 2024), Aug. 19, 2023, 16 pages.

(Continued)

*Primary Examiner* — Huyen X Vo
(74) *Attorney, Agent, or Firm* — GTC Law Group PC & Affiliates

(57) ABSTRACT

A diffusion model may be used to generate an audio signal from text. The diffusion model may process received text and noise vectors to compute encoded audio vectors that correspond to the text. The encoded audio vectors may be decoded to generate an audio signal of a person speaking the text that may be presented to a user. The diffusion model may process a sequence of byte-encoding vectors corresponding to the text, and the use of the byte-encoding vectors may allow for the generation of higher quality audio signals. In some implementations, prompt audio of a person may also be used to generate an audio signal that resembles the speech of that person.

20 Claims, 8 Drawing Sheets

(56) References Cited

OTHER PUBLICATIONS

Chen, Ting, "On the Importance of Noise Scheduling for Diffusion Models", arXiv, https://ar5iv.labs.arxiv.org/html/2301.10972 (accessed on Oct. 21, 2024), 2023, 35 pages.

Chen, Nanxin, et al., "Wavegrad: Estimating gradients for waveform generation", International Conference on Learning Representations 2021 (ICLR 2021), https://openreview.net/forum?id=NsMLjcFaO8O (accessed on Sep. 27, 2024), 2021, 15 pages.

Chowdhery, Aakanksha, et al., "PaLM: Scaling Language Modeling with Pathways", arXiv, arXiv:2204.02311v5 [cs.CL], https://arxiv.org/abs/2204.02311 (accessed on Oct. 21, 2024), Oct. 5, 2022, 87 pages.

Défossez, Alexandre, et al., "High Fidelity Neural Audio Compression", arXiv, arXiv:2210.13438v1 [eess.AS], https://arxiv.org/pdf/2210.13438 (accessed on Oct. 21, 2024), Oct. 24, 2022, 19 pages.

Gulati, Anmol, et al., "Conformer: Convolution-augmented Transformer for Speech Recognition", arXiv:2005.08100v1 [eess.AS], https://arxiv.org/pdf/2005.08100.pdf, May 16, 2020, 5 pages.

Ho, Jonathan, et al., "Cascaded Diffusion Models for High Fidelity Image Generation", Journal of Machine Learning Research, vol. 23, 2022, 33 pages.

Ho, Jonathan, et al., "Classifier-Free Diffusion Guidance", NeurIPS 2021 Workshop on Deep Generative Models and Downstream Applications, https://openreview.net/pdf?id=qw8AKxfYbl (accessed on Oct. 29, 2024), 2021, 8 pages.

Ho, Jonathan, et al., "Denoising Diffusion Probabilistic Models", arXiv, arXiv:2006.11239v2 [cs.LG], https://arxiv.org/pdf/2006.11239 (accessed on Oct. 29, 2024), Dec. 16, 2020, 25 pages.

Ho, Jonathan, et al., "Imagen Video: High Definition Video Generation With Diffusion Models", arXiv:2210.02303v1 [cs.CV], https://arxiv.org/pdf/2210.02303 (accessed on Oct. 22, 2024), Oct. 5, 2022, 18 pages.

Ho, Jonathan, et al., "Video Diffusion Models", arXiv, arXiv:2204.03458v2 [cs.CV], https://arxiv.org/pdf/2204.03458 (accessed on Oct. 29, 2024), Jun. 22, 2022, 15 pages.

Hoogeboom, Emiel, et al., "simple diffusion: End-to-end diffusion for high resolution images", arXiv:2301.11093v2 [cs.CV], https://arxiv.org/pdf/2301.11093 (accessed on Sep. 26, 2024), Dec. 12, 2023, 20 pages.

Hsu, Wei-Ning, et al., "HuBERT: Self-Supervised Speech Representation Learning by Masked Prediction of Hidden Units", IEEE/ACM Trans. Audio, Speech and Lang. Proc., vol. 29, 2021, pp. 3451-3460.

Janner, Michael, et al., "Planning with Diffusion for Flexible Behavior Synthesis", Proceedings of the 39 th International Conference on Machine Learning, Baltimore, Maryland, USA, PMLR 162, (PMLR), 2022, pp. 9902-9915.

Kahn, Jacob, et al., "Librilight: A benchmark for asr with limited or No. supervision", ICASSP 2020—2020 IEEE International Conference on Acoustics, Speech and Signal Processing (ICASSP), https://github.com/facebookresearch/libri-light (accessed on Aug. 20, 2024), 2020, pp. 7669-7673.

Kim, Jaehyeon, et al., "Conditional Variational Autoencoder with Adversarial Learning for End-to-End Text-to-Speech", Proceedings of the 38th International Conference on Machine Learning (PMLR), 139, 2021, pp. 5530-5540.

Kingma, Diederik P., et al., "Variational Diffusion Models", 35th Conference on Neural Information Processing Systems (NeurIPS 2021), 34, 2021, pp. 21696-21707.

Le, Matthew, et al., "Voicebox: Text-Guided Multilingual Universal Speech Generation at Scale", arXiv, arXiv:2306.15687v2 [eess.AS], https://arxiv.org/pdf/2306.15687 (accessed on Oct. 29, 2024), Oct. 2, 2023, 36 pages.

Liu, Rosanne, et al., "Character-Aware Models Improve Visual Text Rendering", arXiv:2212.10562v2 [cs.CL], https://arxiv.org/pdf/2212.10562 (accessed on Sep. 26, 2024), May 3, 2023, 26 pages.

Liu, Ze, et al., "Swin Transformer V2: Scaling Up Capacity and Resolution", 2022 IEEE/CVF Conference on Computer Vision and Pattern Recognition (CVPR), 2022, pp. 11999-12009.

Lugmayr, Andreas, et al., "RePaint: Inpainting using Denoising Diffusion Probabilistic Models", 2022 IEEE/CVF Conference on Computer Vision and Pattern Recognition (CVPR), 2022, pp. 11451-11461.

Meta, "Introducing Voicebox: The Most Versatile AI for Speech Generation", https://about.fb.com/news/2023/06/introducing-voicebox-ai-for-speech-generation/ (accessed on Sep. 26, 2024), Jun. 16, 2023, 8 pages.

Nichol, Alex Quinn, et al., "Improved Denoising Diffusion Probabilistic Models", Proceedings of the 38th International Conference on Machine Learning (PMLR) 139, 2021, pp. 8162-8171.

Panayotov, Vassil, et al., "Librispeech: An ASR Corpus Based On Public Domain Audio Books", IEEE International Conference on Acoustics, Speech, and Signal Processing, http://diyhpl.us/~bryan/papers2/ai/speech-recognition/Librispeech:%20an%20ASR%20corpus%20based%20on%20public%20domain%20audiobooks%20-%202015.pdf (accessed on Oct. 29, 2024), 2015, 5 pages.

Panayotov, Vassil, et al., "Librispeech: An ASR corpus based on public domain audio books", 2015 IEEE International Conference on Acoustics, Speech and Signal Processing (ICASSP), Apr. 19-24, 2015, South Brisbane, Australia, 2015, pp. 5206-5210.

Pratap, Vineel, et al., "MLS: A Large-Scale Multilingual Dataset for Speech Research", arXiv, arXiv:2012.03411v2 [eess.AS], https://arxiv.org/pdf/2012.03411 (accessed on Oct. 29, 2024), Dec. 19, 2020, 10 pages.

Pratap, Vineel, et al., "Scaling Speech Technology to 1,000+ Languages", arXiv, arXiv:2305.13516v1 [cs.CL], https://arxiv.org/pdf/2305.13516 (accessed on Oct. 29, 2024), May 22, 2023, 41 pages.

Rombach, Robin, et al., "High-Resolution Image Synthesis with Latent Diffusion Models", arXiv, arXiv:2112.10752v2 [cs.CV], submitted on Dec. 20, 2021, https://arxiv.org/pdf/2112.10752 (accessed on Oct. 28, 2024), Apr. 13, 2022, 45 pages.

Saharia, Chitwan, et al., "Image Super-Resolution via Iterative Refinement", IEEE Transactions on Pattern Analysis and Machine Intelligence, vol. 45, No. 4, https://ieeexplore.ieee.org/stamp/stamp.jsp?tp=&arnumber=9887996 (accessed on Oct. 29, 2024), 2023, pp. 4713-4726.

Saharia, Chitwan, et al., "Palette: Image-to-Image Diffusion Models", Special Interest Group on Computer Graphics and Interactive Techniques Conference Proceedings (SIGGRAPH '22 Conference Proceedings), Aug. 7-11, 2022, Vancouver, BC, Canada. ACM, New York, NY, USA, 2022, 10 pages.

Saharia, Chitwan, et al., "Photorealistic Text-to-Image Diffusion Models with Deep Language Understanding", 36th Conference on Neural Information Processing Systems (NeurIPS), Advances in Neural Information Processing Systems, 35, https://proceedings.neurips.cc/paper_files/paper/2022/file/ec795aeadae0b7d230fa35cbaf04c041-Paper-Conference.pdf, 2022, pp. 36479-36494.

Salimans, Tim, et al., "Progressive Distillation for Fast Sampling of Diffusion Models", International Conference on Learning Representations (ICLR), https://openreview.net/pdf?id=TldIXIpzhol (accessed on Oct. 28, 2024), 2022, 21 pages.

Shazeer, Noam, "GLU Variants Improve Transformer", arXiv, arXiv:2002.05202v1 [cs.LG], https://arxiv.org/pdf/2002.05202 (accessed on Oct. 28, 2024), Feb. 2020, 5 pages.

Shen, Kai, et al., "NaturalSpeech 2: Latent Diffusion Models are Natural and Zero-Shot Speech and Singing", https://speechresearch.github.io/naturalspeech2/ (accessed on Sep. 26, 2024), 12 pages.

Shen, Kai, et al., "NaturalSpeech 2: Latent Diffusion Models are Natural and Zero-Shot Speech and Singing Synthesizers", arXiv:2304.09116v3 [eess.AS], https://arxiv.org/pdf/2304.09116 (accessed on Sep. 26, 2024), May 30, 2023, 22 pages.

Sohl-Dickstein, Jascha, et al., "Deep Unsupervised Learning Using Nonequilibrium Thermodynamics", Proceedings of the 32nd International Conference on Machine Learning (PMLR), Lille, France, 2015. JMLR: W&CP vol. 37, 2015, pp. 2256-2265.

Song, Jiaming, et al., "Pseudoinverse-Guided Diffusion Models for Inverse Problems", International Conference on Learning Representations (ICLR), https://openreview.net/pdf?id=9_gsMA8MRKQ (accessed on Oct. 28, 2024), 2023, 30 pages.

(56) References Cited

OTHER PUBLICATIONS

Song, Yang, et al., "Solving Inverse Problems in Medical Imaging with Score-Based Generative Models", International Conference on Learning Representations (ICLR), https://openreview.net/pdf?id=vaRCHVjOuGI (accessed on Oct. 28, 2024), 2022, 18 pages.

Van Den Oord, Aaron, et al., "Neural Discrete Representation Learning", 31st Conference on Neural Information Processing Systems (NIPS 2017), Long Beach, CA, USA, Advances in Neural Information Processing Systems, vol. 30, https://proceedings.neurips.cc/paper_files/paper/2017/file/7a98af17e63a0ac09ce2e96d03992fbc-Paper.pdf, 2017, 10 pages.

Vaswani, Ashish, et al., "Attention Is All You Need", 31st Conference on Neural Information Processing Systems (NIPS), Long Beach, CA, USA, https://proceedings.neurips.cc/paper_files/paper/2017/file/3f5ee243547dee91fbd053c1c4a845aa-Paper.pdf, 2017, 11 pages.

Wang, Wenxiao, et al., "CrossFormer: A Versatile Vision Transformer Hinging on Cross-Scale Attention", International Conference on Learning Representations (ICLR), https://openreview.net/pdf?id=_PHymLlxul (accessed on Oct. 28, 2024), Jan. 28, 2022, 16 pages.

Wang, Chengyi, et al., "Neural Codec Language Models are Zero-Shot Text to Speech Synthesizers", arXiv:2301.02111v1 [cs.CL], https://arxiv.org/pdf/2301.02111 (accessed on Oct. 28, 2024), Jan. 5, 2023, 16 pages.

Xiong, Ruibin, et al., "On Layer Normalization in the Transformer Architecture", Proceedings of the 37th International Conference on Machine Learning, Online, PMLR 119, 2020, pp. 10524-10533.

Zeghidour, Neil, et al., "Soundstream: An end-to-end neural audio codec", IEEE/ACM Transactions on Audio, Speech, and Language Processing, vol. 30, 2022, pp. 495-507.

Zhang, Biao, et al., "Root mean square layer normalization", Advances in Neural Information Processing Systems 32 (NeurIPS 2019), 33rd Conference on Neural Information Processing Systems (NeurIPS 2019), Vancouver, Canada, https://papers.nips.cc/paper_files/paper/2019/file/1e8a19426224ca89e83cef47f1e7f53b-Paper.pdf, 2019, 12 pages.

\* cited by examiner

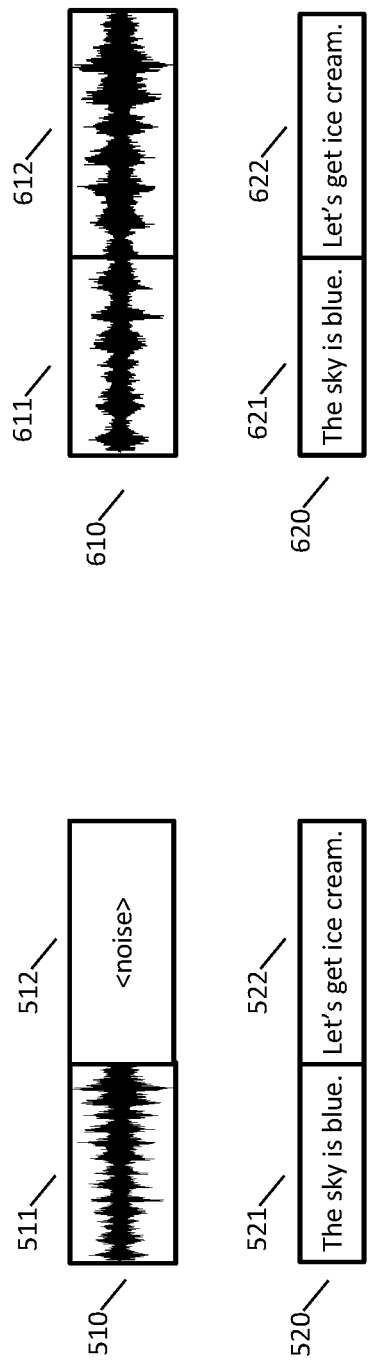

TEXT-TO-AUDIO CONVERSION WITH BYTE-ENCODING VECTORS

CLAIM OF PRIORITY

This patent application claims the benefit of U.S. Patent Application Ser. No. 63/539,692, filed Sep. 21, 2023, and entitled "SIMPLE-TTS: END-TO-END TEXT-TO-SPEECH SYNTHESIS WITH LATENT DIFFUSION".

The content of the foregoing application is hereby incorporated by reference in its entirety for all purposes.

BACKGROUND

Previous approaches for generating audio signals from text have primarily relied on traditional text-to-speech (TTS) techniques. These techniques typically involve converting text into phonetic representations and then synthesizing speech using pre-recorded or synthesized speech segments. While TTS systems have been widely used and have improved over time, they often lack naturalness and can sound robotic or unnatural to listeners.

Another approach that has been explored is the use of neural networks for speech synthesis. These systems use deep learning algorithms to generate speech directly from text. By training on large datasets of speech recordings, these neural networks can learn to generate more natural and human-like speech. However, these approaches often require significant computational resources and can be computationally expensive, limiting their real-time applicability.

However, none of these approaches have provided a comprehensive solution that combines the features described in this disclosure.

SUMMARY

In some aspects, the techniques described herein relate to a computer-implemented method for generating an audio signal from text, including: receiving the text; computing a sequence of byte-encoding vectors from the text; computing a sequence of noise vectors; computing a first sequence of encoded audio vectors by processing the sequence of noise vectors, the sequence of byte-encoding vectors, and a first noise-schedule weight with a neural network; computing a second sequence of encoded audio vectors by processing the first sequence of encoded audio vectors, the sequence of byte-encoding vectors, and a second noise-schedule weight with the neural network; computing a final sequence of encoded audio vectors by processing a penultimate sequence of encoded audio vectors, the sequence of byte-encoding vectors, and a final noise-schedule weight with the neural network; and computing the audio signal by processing the final sequence of encoded audio vectors with an audio decoder.

In some aspects, the techniques described herein relate to a computer-implemented method, wherein the neural network includes: a residual block layer; a downsampling layer; a transformer layer; and an upsampling layer.

In some aspects, the techniques described herein relate to a computer-implemented method, wherein the transformer layer includes a cross-attention layer for processing the sequence of byte-encoding vectors.

In some aspects, the techniques described herein relate to a computer-implemented method, wherein the first noise-schedule weight, the second noise-schedule weight, and the final noise-schedule weight are selected from a noise schedule.

In some aspects, the techniques described herein relate to a computer-implemented method, wherein the noise schedule is a scaled noise schedule.

In some aspects, the techniques described herein relate to a computer-implemented method, wherein the scaled noise schedule is computed using a sigmoid function.

In some aspects, the techniques described herein relate to a computer-implemented method, wherein the scaled noise schedule is a cosine noise schedule.

In some aspects, the techniques described herein relate to a system, including at least one server computer including at least one processor and at least one memory, the at least one server computer configured to: receive text; compute a sequence of byte-encoding vectors from the text; compute a sequence of noise vectors; compute a first sequence of encoded audio vectors by processing the sequence of noise vectors, the sequence of byte-encoding vectors, and a first noise-schedule weight with a neural network; compute a second sequence of encoded audio vectors by processing the first sequence of encoded audio vectors, the sequence of byte-encoding vectors, and a second noise-schedule weight with the neural network; compute a final sequence of encoded audio vectors by processing a penultimate sequence of encoded audio vectors, the sequence of byte-encoding vectors, and a final noise-schedule weight with the neural network; and compute an audio signal by processing the final sequence of encoded audio vectors with an audio decoder.

In some aspects, the techniques described herein relate to a system, wherein the neural network includes a cross-attention layer for processing the sequence of byte-encoding vectors.

In some aspects, the techniques described herein relate to a system, wherein the sequence of byte-encoding vectors are computed using embeddings of bytes corresponding to the text.

In some aspects, the techniques described herein relate to a system, wherein the at least one server computer is configured to: receive a sequence of prompt encoded-audio vectors; and compute the first sequence of encoded audio vectors by processing the sequence of prompt encoded-audio vectors with the neural network; wherein: the text includes prompt text and target text, and the prompt text corresponds the sequence of prompt encoded-audio vectors.

In some aspects, the techniques described herein relate to a system, wherein the at least one server computer is configured to remove a portion of the audio signal corresponding to the sequence of prompt encoded-audio vectors.

In some aspects, the techniques described herein relate to a system, wherein the at least one server computer is configured to: determine an audio signal length; and generate the sequence of noise vectors using the audio signal length.

In some aspects, the techniques described herein relate to a system, wherein the neural network includes: a contracting path, wherein the contracting path includes a first residual block layer and an downsampling layer; a transformer layer; and an expanding path, wherein the expanding path includes a second residual block layer and an upsampling layer.

In some aspects, the techniques described herein relate to one or more non-transitory, computer-readable media including computer-executable instructions that, when executed, cause at least one processor to perform actions including: receiving text; computing a sequence of byte-encoding vectors from the text; computing a sequence of noise vectors; computing a first sequence of encoded audio vectors by processing the sequence of noise vectors, the sequence of byte-encoding vectors, and a first noise-schedule weight with a neural network; computing a second sequence of encoded audio vectors by processing the first sequence of encoded audio vectors, the sequence of byte-encoding vectors, and a second noise-schedule weight with the neural network; computing a final sequence of encoded audio vectors by processing a penultimate sequence of encoded audio vectors, the sequence of byte-encoding vectors, and a final noise-schedule weight with the neural network; and computing an audio signal by processing the final sequence of encoded audio vectors with an audio decoder.

In some aspects, the techniques described herein relate to one or more non-transitory, computer-readable media, wherein the sequence of byte-encoding vectors are computed using UTF-8 bytes corresponding to the text.

In some aspects, the techniques described herein relate to one or more non-transitory, computer-readable media, wherein computing the first sequence of encoded audio vectors includes: computing a sequence of contracted vectors by processing the sequence of noise vectors, the sequence of byte-encoding vectors, and the first noise-schedule weight with a contracting path, wherein the contracting path includes a first convolutional neural network layer and a downsampling layer; computing a sequence of transformed contracted vectors by processing the sequence of contracted vectors, the sequence of byte-encoding vectors, and the first noise-schedule weight with a transformer block; and computing a sequence of expanded vectors by processing the sequence of transformed contracted vectors, the sequence of byte-encoding vectors, and the first noise-schedule weight with an expanding path, wherein the expanding path includes a second convolutional neural network layer and an upsampling layer.

In some aspects, the techniques described herein relate to one or more non-transitory, computer-readable media, wherein computing the sequence of noise vectors includes sampling a Gaussian noise distribution.

In some aspects, the techniques described herein relate to one or more non-transitory, computer-readable media, wherein the neural network operates to reverse a diffusion process.

In some aspects, the techniques described herein relate to one or more non-transitory, computer-readable media, wherein the sequence of byte-encoding vectors provide information about semantic meaning of the text in context.

BRIEF DESCRIPTION OF THE FIGURES

The invention and the following detailed description of certain embodiments thereof may be understood by reference to the following figures:

FIG. 5 is an example of text input and encoded audio vectors that may be used to generate speech audio that sounds like a specified person.

FIG. 6 is an example of text input and encoded audio vectors that may be used to train a diffusion model that generates speech audio that sounds like a specified person.

DETAILED DESCRIPTION

In a variety of applications, it may be desired to generate a speech audio signal from text. For example, given the text "hello," a speech audio signal may be generated that sounds like a person saying the word "hello." The audio may be a generic voice or may correspond to a specific person. Tools that generate speech audio from text may be referred to as text-to-speech (TTS) tools. TTS tools may be used for voice user interfaces, such as personal assistants (e.g., Amazon Alexa or Google Home).

The technology of TTS tools has changed greatly over the years with newer technology providing higher quality audio. More recently, neural networks called diffusion models have been used to greatly improve the generation of content. Diffusion models, such as DALL-E, have been applied to generate images from a text description of the image. Diffusion models may also be used to generate a speech audio signal from text. Existing diffusion models for TTS generation provide high quality speech audio, but use complex technology that increases costs and limits their applications. Described herein is a diffusion model for TTS that provides high quality speech audio with less complex technology.

Figure 1:
FIG. 1 is an example system for implementing an autoencoder.

Diffusion models may be built on top of the concept of an autoencoder. FIG. 1 is an example system for implementing an autoencoder. An autoencoder includes audio encoder 110 and audio decoder 120. Input speech audio may be processed by audio encoder 110 to generate encoded audio. For example, the input speech audio may be a sequence of time samples of an audio signal with a specified sampling rate and quantization depth. The encoded audio may be a sequence of vectors that represents the speech audio.

The encoded audio may then be processed by audio decoder 120 to regenerate speech audio. In some implementations, the regenerated speech audio may be an exact match of the input speech audio, and the encoder may be referred to as a lossless audio encoder. In some implementations, the regenerated speech audio may be similar to but different from the input speech audio, and the encoder may be referred to as a lossy audio encoder. In general, the size of the encoded audio is smaller than the size of the input speech audio, and encoded audio operates to provide data compression. Any appropriate audio encoder and decoder may be used, such as EnCodec or SoundStream.

Diffusion models operate in the encoded audio space between the audio encoder and the audio decoder. A diffusion model generates encoded audio that resembles encoded audio of real speech. Accordingly, when that encoded audio is decoded to generate a speech audio signal, that speech audio signal sounds like real speech audio. An advantage of the diffusion model operating in the encoded audio space is that the number of parameters (or size) is much smaller so the neural networks can also be smaller than if they were directly processing a speech audio signal.

In order for a diffusion model to work, the diffusion model has to learn what encoded speech audio looks like. Where the diffusion model has data that does not look like encoded audio, that diffusion model may modify that data so that it more closely resembles encoded audio. A diffusion model can learn through a training process (a) what encoded speech audio looks like and (b) how to modify data to more closely resemble encoded speech audio.

In some implementations, a diffusion model may operate iteratively to transform an input into data that looks like encoded speech audio. In some implementations, the starting point for generating encoded audio may be noise, such as Gaussian noise. Where it is desired to generate audio of a certain length, a sequence of noise vectors may be generated where the length of the sequence is the same as the length of encoded audio vectors for an audio signal of that length.

Figure 2:
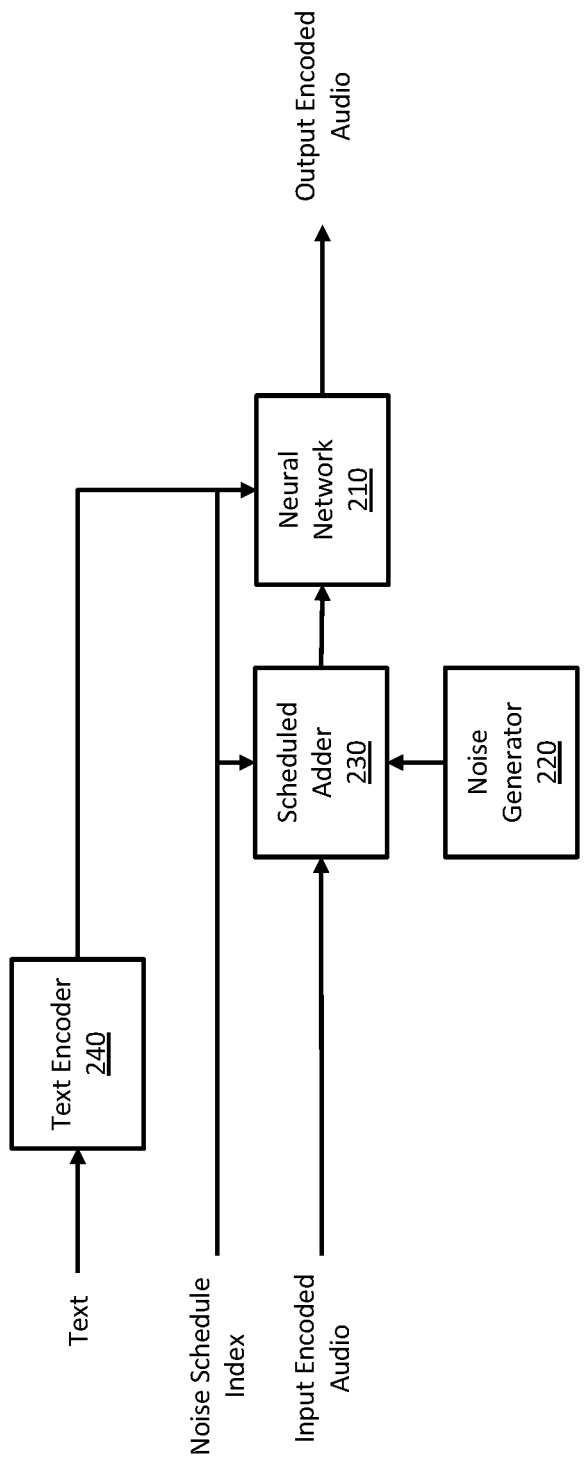
FIG. 2 is an example system for training a diffusion model for generating encoded speech audio from text.

FIG. 2 is an example system for training a diffusion model for generating encoded speech audio from text. The training of a diffusion model may use a corpus of training data. The training data may include training samples where a training sample has a representation of a speech audio signal (e.g., digital audio samples or encoded audio vectors) and text corresponding to the speech audio signal.

The training process may proceed iteratively over the training data using a noise schedule. A single training iteration will process encoded training audio and text corresponding to that audio. In addition, the training will process a noise schedule weight, where the noise schedule weight corresponds to an amount of noise to be added to the encoded audio vector. For example, a noise schedule may have 200 steps and each step may have a corresponding weight. In some implementations, a noise schedule may have less than 200 steps (such as 180, 150, or less) or more than 200 steps (such as 250, 300, or more). The number of steps may depend on the length of the audio vector, parameters of the neural network, encoding of the audio, or any other appropriate factors. For example, a longer audio vector may use a noise schedule with more steps than a shorter audio vector. An earlier step may correspond to higher noise level and a later step may correspond to lower noise level (or vice versa). The noise schedule weight may be selected using any appropriate techniques (e.g., randomly or iterating over the weights).

In some implementations, the noise schedule may be a scaled noise schedule or a shifted noise schedule may be used as described herein. For example, the noise schedule may be computed using a sigmoid function. For another example, the noise schedule may be a cosine noise schedule or a scaled cosine noise schedule.

During the training process, the input encoded training audio may be modified to make it noisy where the amount of noise is specified by the noise schedule weight. The noisy encoded audio may be generated using any appropriate techniques. In some implementations, noise generator 220 may generate a sequence of noise vectors that are the same size and length as the input encoded audio. Any appropriate type of noise may be used, such as Gaussian noise obtained by sampling a Gaussian noise distribution. Scheduled adder 230 may generate the noisy encoded audio by performing a weighted addition of the input encoded audio and the sequence of noise vectors where the relative weights are determined according to the noise schedule weight. In other implementations, noise generator 220 may generate noise with a specified variance according to the noise schedule weight.

In FIG. 2, neural network 210 processes the noisy encoded audio and a representation of the text corresponding to the audio to compute output encoded audio. The parameters of neural network 210 are trained to reduce the noise in the noisy encoded audio so that the output encoded audio is close to the input encoded audio. The parameters of neural network 210 may be trained to reverse a diffusion process to iteratively convert noise vectors to desired encoded audio vectors as described herein.

The representation of the text processed by neural network 210 is computed by text encoder 240. Text encoder 240 processes the text corresponding to the training sample to compute an encoded representation of the text referred to herein as encoded text. Any appropriate encoded text may be used. In some implementations, the encoded text may be a ByT5 or T5 representation of the text. In some implementations, the encoded text may be a sequence of embedding vectors corresponding to the text. For example, the embedding vectors may be character embeddings or word embeddings.

In some implementations, the text may be represented as a sequence of byte-encoding vectors. For example, the text may be converted to a sequence of bytes (e.g., UTF-8) and the sequence of bytes may be replaced by vectors corresponding to those bytes (e.g., vectors determined by ByT5). For another example, the text may be converted to a sequence of bytes, and the bytes may be replaced by embedding vectors corresponding to the bytes. For another example, the text may be converted to a sequence of bytes, and the bytes may be replaced by embedding vectors corresponding to the bytes, and the embedding vectors may be further processed to generate contextual embedding vectors that represent the semantic meaning of the text in context. Contextual embedding vectors may be computed from embedding vectors using any appropriate techniques, such as processing the embedding vectors with a transformer neural network or a neural network with one or more transformer layers.

In some implementations, the encoded text may be contextual in that the representation indicates the semantic meaning of portions of the text (e.g., words) in the context of the sentence. For example, depending on the context, "bank" might refer to a river bank or bank for your savings account. Any appropriate contextual representation may be used, such as a contextual representation (e.g., embeddings) generated by a transformer neural network (e.g., BERT) or a contextual representation determined by a ByT5 encoder.

In some implementations, the encoded text may be further processed before being processed by neural network 210. For example, the encoded text may be processed with a multi-layer perceptron and combined (e.g., added to) with a representation of the noise-schedule weight.

In some implementations, the noise-schedule weight may be further processed before being processed by neural network 210. For example, the noise-schedule weight may be processed with a multi-layer perceptron before being combined with the encoded text.

The process of computing the output encoded audio from the input encoded audio, text, noise schedule weight, and the sampled noise may be referred to as a forward pass of the training process. The objective of the training is for the output encoded audio to be close to the input encoded audio. A training loss may be computed from the output encoded audio and the input encoded audio. A backward pass may be performed to update parameters of neural network 210 so that neural network 210 may learn how to reduce the noise that was added to the input encoded audio. Any appropriate training techniques may be used such as stochastic, batch, or minibatch gradient descent.

In some implementations, at least a portion of the training data may not include text. For training samples without text, the training process may operate to remove the noise from the input encoded audio without information about the text corresponding to the encoded audio. For such training samples, the text input may be set to any appropriate values, such as values corresponding to zero or values corresponding to a token indicating that no text is present.

The above training operations may be performed iteratively over the training corpus until a desired stopping criterion is reached. The training corpus may be processed multiple times. After training is complete, the neural network may be used in production to generate speech audio from text.

Figure 3:
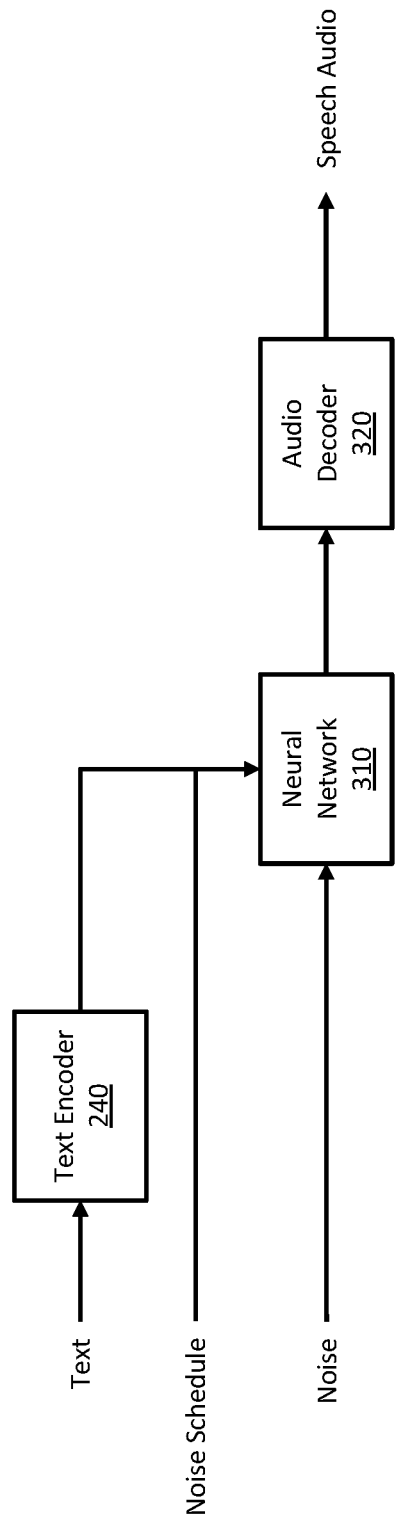
FIG. 3 is an example system for generating speech audio from text.

FIG. 3 is an example system for generating speech audio from text. In FIG. 3 the inputs are the text to be used to generate speech, a noise schedule (which may be different from the noise schedule used in FIG. 2), and noise vectors. The text may be any text for which it is desired to generate speech.

The noise schedule is a sequence of noise schedule weights (or noise variances). The sequence of noise schedule weights may correspond to all noise schedule weights used during training or a subset of them. For example, suppose the training noise schedule included 200 weights with the first weight corresponding to higher noise and the last weight corresponding to lower noise. In some implementations, the noise schedule may correspond to the entire sequence of 200 weights. In some implementations, the noise schedule may correspond to a subset of the 200 weights, such as every tenth weight. Any appropriate considerations may be used to determine the noise schedule, such as a desired tradeoff of quality of generated speech versus computation time.

The input noise vectors may be any appropriate noise vectors, such as noise vectors generated by noise generator 220. The number of noise vectors may correspond to a desired length of speech. For example, an audio signal length may be determined from the input text (e.g., based on the number and/or type of characters and/or phonemes). A number of noise vectors may then be determined from the audio signal length (e.g., using the compression rate of the speech encoder). The length of the noise vectors may be determined to match the configuration of the selected audio decoder.

Text encoder 240 may operate as described above and generate encoded text vectors.

Neural network 310 may process the encoded text vectors, the noise schedule, and the noise vectors to generate encoded audio. The processing of neural network 310 may proceed iteratively according to the noise schedule. Any appropriate number of iterations may be performed, such as between 50 to 250 iterations. For example, for a first noise schedule weight, neural network 310 may process the encoded text, the first noise schedule weight, and the noise vectors to generate first denoised encoded audio. Neural network 310 may then process the encoded text, the second noise schedule weight, and the first denoised encoded audio to generate second denoised encoded audio. Neural network 310 may then process the encoded text, the third noise schedule weight, and the second denoised encoded audio to generate third denoised encoded audio. This process may continue until all of the input noise schedule indices have been processed or until any other appropriate desired stopping criterion has been reached.

The final denoised encoded audio generated by neural network 310 may then be processed by audio decoder 320 to generate speech audio. Audio decoder 320 may use any appropriate audio decoder, such as any of the audio decoders described herein. The speech audio may then be used for any appropriate application, such as a voice user interface.

Now described are example implementations of neural network layers that may be used for training a diffusion model or for generating speech audio from text using a diffusion model.

Figure 4:
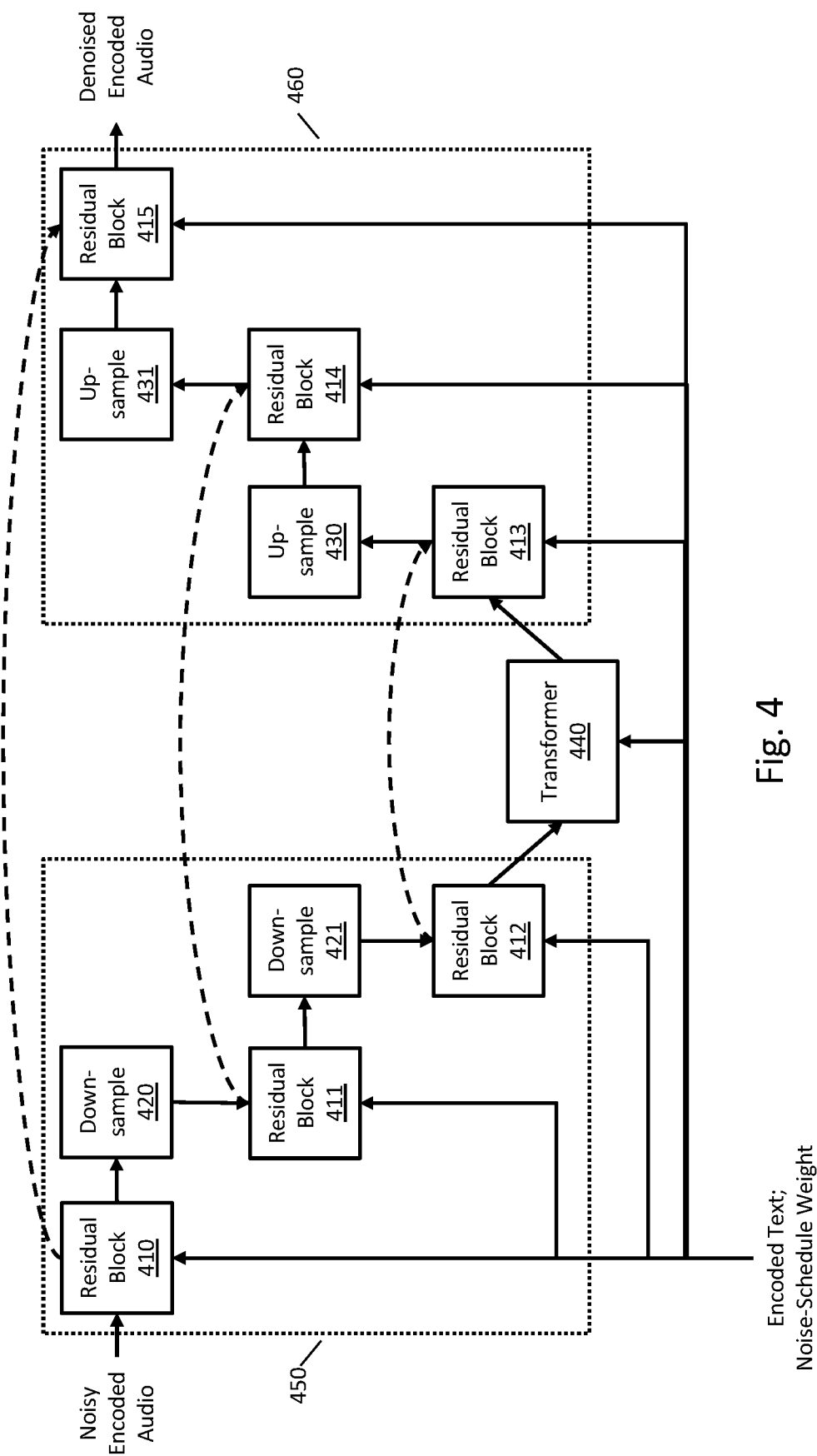
FIG. 4 is an example sequence of neural network layers that may be used with a diffusion model.

FIG. 4 is an example sequence of neural network layers that may be used to train a diffusion model for generating speech audio from text or that could be used to generate speech audio from text. For example, the described neural network layers may be used by neural network 210 and/or neural network 310.

In FIG. 4, noisy encoded audio is received as an input. For example, the noisy encoded audio may be data that received by neural network 210 and/or neural network 310. The noisy encoded audio is processed by a sequence of neural network layers to generate denoised encoded audio. The denoised encoded audio may have noise, but the processing of the neural network layers should reduce the amount of noise as compared to the noisy encoded audio. The neural network layers may be categorized into three groups: contracting path 450, transformer block 440, and expanding path 460.

In FIG. 4, inputs also include encoded text and a noise-schedule weight. The encoded text may correspond to text for which it is desired to generate speech audio, and the encoded text may be computed from the text using any appropriate encoding techniques, such as any of the text encoding techniques described herein. The noise-schedule weight may be part of a noise schedule as described herein. The encoded text and noise-schedule weight may be inputs into some or all of the neural network layers in FIG. 4.

The encoded text and a noise-schedule weight may be processed or conditioned before being processed by neural network layers. Any appropriate conditioning of the encoded text and a noise-schedule weight may be performed, such as any of the conditioning techniques described herein.

Contracting path 450 may process the input encoded audio to compute a sequence of contracted vectors. Contracting path 450 may include one or more residual block layers, such as residual block 410, residual block 411, and residual block 412. A residual block layer may include one or more convolutional neural network layers. A residual block layer may also include one or more passthrough connections. Contracting path 450 may also include one or downsampling layers, such as downsampling layer 420 and downsampling layer 421. In some implementations, residual block layers and downsampling layers may be alternated sequentially as shown in FIG. 4. Layers of contracting path 450 may also process the encoded text and the noise-schedule weight or conditioned versions thereof. The output of contracting path 450 may be referred to as a sequence of contracted vectors.

Transformer block 440 may process the output of contracting path 450 to compute a sequence of transformed contracted vectors. Transformer block 440 may include any appropriate implementation of transformer block neural network layers. Transformer block 440 may include, for example, any of the following: a parallel multi-head attention mechanism, a feed forward layer, a normalization layer, or a linear layer. Transformer block 440 may also process the encoded text and the noise-schedule weight or conditioned versions thereof.

Expanding path 460 may process the output of transformer block 440 to compute a sequence of expanded vectors. Expanding path 460 may include one or more residual block layers, such as residual block 413, residual block 414, and residual block 415. A residual block layer may be implemented as described herein. The residual blocks of expanding path 460 may also process as inputs computations of the residual blocks of contracting path 450 (e.g., the outputs of those residual blocks or intermediate computations of those residual blocks) as indicated by the dashed lines. Expanding path 460 may also include one or upsampling layers, such as upsampling layer 430 and upsampling layer 431. In some implementations, residual block layers and upsampling layers may be alternated sequentially as shown in FIG. 4. Layers of expanding path 460 may also process the encoded text and the noise-schedule weight or conditioned versions thereof. The output of expanding path 460 may be referred to as a sequence of expanded vectors or as denoised encoded audio.

Where the neural network layers of FIG. 4 are used for training a diffusion model, a loss may be computed using the noisy encoded audio and the denoised encoded audio and this loss may be used during a backward path to update the parameters of the neural network layers (e.g., the parameters of the residual blocks and the transformer block).

Where the neural network layers of FIG. 4 are used in production to generate a speech audio signal from text, the processing of FIG. 4 may proceed iteratively. For a first iteration, the first noisy encoded audio may comprise noise vectors that are obtained from a noise generator (e.g., a Gaussian noise generator). The first iteration may use a first noise-schedule weight, and the output may be first denoised encoded audio. For a second iteration, the first denoised encoded audio may be the input to the neural network layers (e.g., and may be referred to as second noisy encoded audio). The second iteration may sed a second noise-schedule weight (e.g., the next noise-schedule weight in the noise schedule), and the output may be second denoised encoded audio. This process may be repeated any number of times until a desired stopping criterion is reached, such as completing all the steps of the noise schedule. The final denoised encoded audio may be processed with an audio decoder to generate a speech audio signal that may be used in the production application (e.g., a voice user interface).

In some implementations, it may be desired to generate a speech audio signal that sounds like the speech of a particular person, such as a user of a product or a famous person. It may be desired to have a single diffusion model that is able to generate speech audio signals that sound like different people. The techniques described above may be modified to also generate speech audio that sounds like a specified or particular person.

FIG. 5 is an example of text input and encoded audio vectors that may be used to generate speech audio that sounds like a specified person. In FIG. 5, prompt encoded-audio 511 represents a sequence of prompt encoded-audio vectors computed from a speech audio signal of a specified person. Prompt text 521 is the text corresponding to prompt encoded-audio 511 (e.g., a transcription of the corresponding speech audio signal).

In FIG. 5, noise 512 is a sequence of noise vectors that may be used for the techniques described herein, such as noise vectors generated by noise generator 220. Target text 522 is text for which it is desired to generate a speech audio signal where the speech sounds like the specified person.

For the techniques described above in FIG. 3, noise 512 and target text 522 may be used to generate a speech audio signal corresponding to target text 522. This processing, however, does not allow the output speech audio signal to sound like a specified or particular person.

The concatenation of prompt encoded-audio 511 and noise 512 may be referred to as input encoded-audio 510. The concatenation of prompt text 521 and target text 522 may be referred to as input text 520. Input encoded-audio 510 and input text 520 may be used as inputs for the processing of FIG. 3, and the output speech audio generated by FIG. 3 will sound like speech of the specified person (i.e., the person who spoke the speech audio of prompt encoded-audio 511). By concatenating encoded speech audio of the specified person with noise vectors, the neural network iteratively modifies the noise vectors so that they resemble the speech of prompt encoded-audio 511.

The output speech audio will include speech audio of both prompt text 521 and target text 522. It may be desired to have only the speech audio of target text 522 and post-processing may be performed to remove the speech audio corresponding to prompt text 521, such as by removing speech audio before a time threshold.

In some implementations, the process described above for FIG. 5 may be implemented without prompt text 521. The prompt text may be set to any appropriate values to indicate that no text is available. The diffusion model may use target text 522 to convert noise 512 to encoded audio that represents target text 522 and sounds like the speaker of prompt encoded-audio 511.

In some implementations, the process of training a diffusion model may also be modified to facilitate the generation of speech audio that sounds like a specified or particular person.

FIG. 6 is an example of text input and encoded audio vectors that may be used to train a diffusion model that generates speech audio that sounds like a specified person. In FIG. 6, training encoded-audio 610 represents encoded audio-vectors computed from a speech audio signal of a specified person. Training text 620 is the text corresponding to training encoded-audio 610 (e.g., a transcription of the corresponding speech audio signal).

Each of encoded-audio 610 and training text 620 are split into two portions. Training encoded-audio 611 is a first portion of training encoded-audio 610 and training text 621 is training text corresponding to training encoded-audio 611. Training encoded-audio 612 is a second portion of training encoded-audio 610 and training text 622 is training text corresponding to training encoded-audio 612. During training, noise may be added to training encoded-audio 612 and training encoded-audio 611 may be processed without adding any noise. Training in this manner allows the diffusion model to learn to remove the noise from training encoded-audio 612 so that the remaining speech has similar qualities to the speech of training encoded-audio 611.

The training process may be performed using speech of a variety of speakers so that the diffusion model is able to learn to generate speech audio corresponding to different speakers. Training a diffusion model using training data as described in FIG. 6 may result in a diffusion model that is more capable of generating speech audio that sounds like a specific or particular person.

Figure 7:
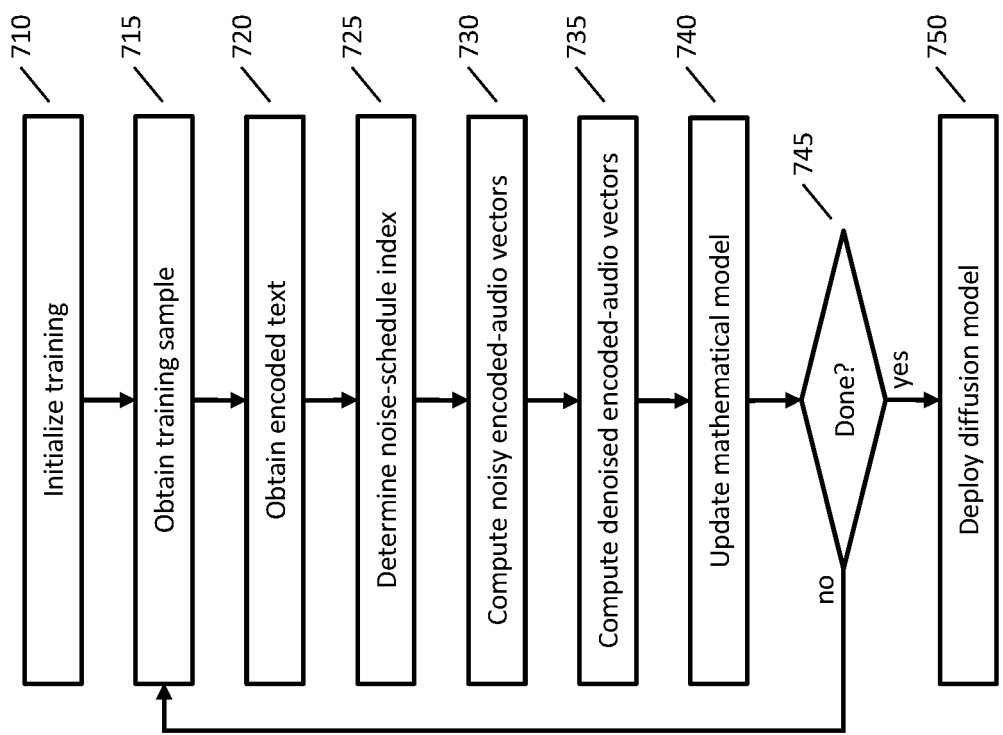
FIG. 7 is a flowchart of an example method for training a diffusion model for generating speech audio from text.

FIG. 7 is a flowchart of an example method for training a diffusion model for generating speech audio from text.

At step 710, the training process is initialized. Any appropriate steps may be performed, such as initializing parameters of the models (e.g., neural network parameters) with random values.

At steps 715 through 745, and iterative training process may be performed. An iteration of the training process may include performing operations with a training sample from a training corpus. Any appropriate training data may be used and a training sample may include any appropriate information, such as text, an encoded representation of the text (e.g., embedding vectors or byte-encoding vectors), an audio signal of a person speaking the text, or encoded audio vectors of an audio signal of a person speaking the text. The iterations of the training process may be determined using any appropriate techniques. For example, the training samples may be shuffled, and the training process may be iterated over the shuffled training samples, and this process may be repeated multiple times.

At step 715, a training sample may be obtained.

At step 720, encoded text corresponding to text of the training sample is obtained. Any appropriate encoded text may be obtained, such as any of the encoded text described herein. In some implementations, the encoded text may be computed in advance and stored with the training sample, and in some implementations, the encoded text may be computed as needed during the training iteration.

At step 725, a noise-schedule weight is determined from a noise schedule. The noise schedule weight may be determined using any appropriate techniques. In some implementations, the noise-schedule weights may be shuffled and used in sequence with the training iterations. In some implementations, a noise-schedule weight may be selected randomly.

At step 730, noisy encoded-audio vectors are computed. The noisy encoded-audio vectors may be computed using any appropriate techniques, such as any of the techniques described herein. Encoded audio vectors may be obtained from the training sample or may be computed from an audio signal in the training sample. Noise vectors may be generated having the same shape or dimensions as the encoded audio vectors. The noisy encoded-audio vectors may be computed by combining the encoded audio vectors with the noise vectors according to the noise-schedule weight (e.g., by performing a weighted sum of the encoded audio vectors with the noise vectors).

At step 735, denoised encoded-audio vectors are computed by processing the noisy encoded-audio vectors with a mathematical model, such as a neural network. Any appropriate processing and mathematical models may be used, such as any of the processing and mathematical model described herein. For example, the mathematical model may be a neural network that processes the encoded text and the noise-schedule weight and that includes a contracting path, a transformer layer, and an expanding path.

At step 740, the mathematical model is updated. The mathematical model may be updated using any appropriate techniques, such as any of the techniques described herein. For example, a loss may be computed using the denoised encoded-audio vectors and the encoded-audio vectors of the training sample. The mathematical model parameters may then be updated using techniques as backpropagation and stochastic gradient descent. In some implementations, step 740 may not be performed at each iteration and may instead be performed in batches using the loss from multiple iterations.

At step 745, it is determined if the training process is complete. Any appropriate techniques may be used to determine if the training process is complete, such as when the magnitude of the loss falls below a convergence threshold. Where training is not complete, processing proceeds to step 715 where another training iteration is performed. Where training is complete, processing proceeds to step 750.

At step 750, any appropriate post-training processing may be performed, and the trained diffusion model may be deployed to a production system to generate speech audio from text.

Many variations of the processing of FIG. 7 are possible, such as any of the variations described herein. In some implementations, FIG. 7 may be modified to incorporate the variations described in FIG. 6.

Figure 8:
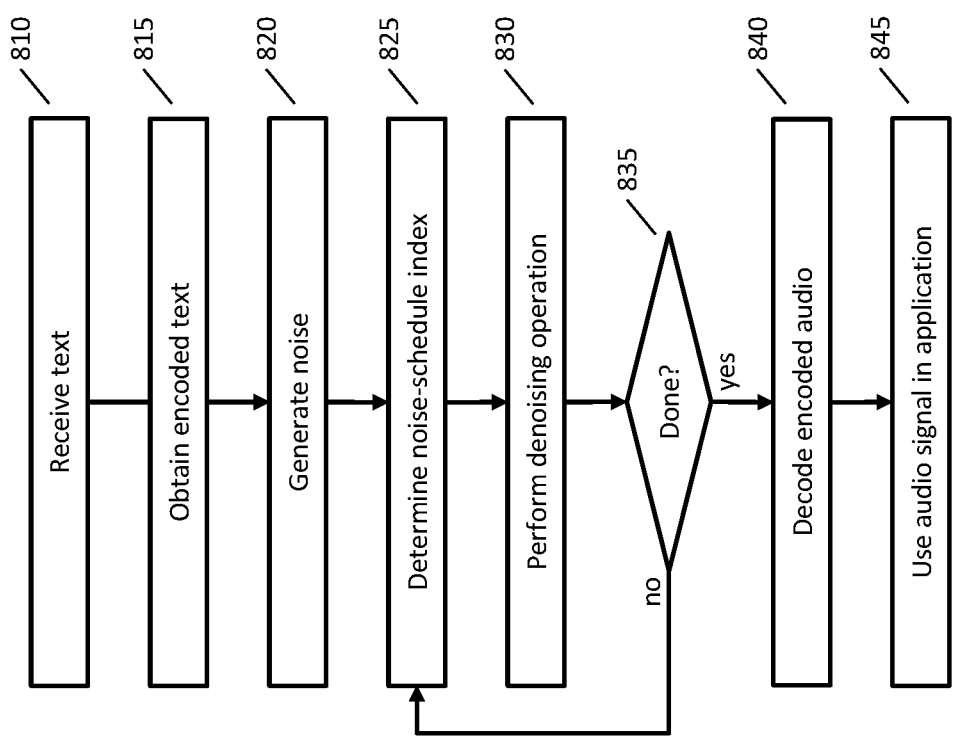
FIG. 8 is a flowchart of an example method for using a diffusion model to generate speech audio from text.

FIG. 8 is a flowchart of an example method for using a diffusion model to generate speech audio from text.

At step 810, text is received for which it is desired to generate speech audio speaking that text. The text may be received using any appropriate techniques (e.g., an API call) and may be in any appropriate format (e.g., UTF-8 bytes).

At step 815, encoded text corresponding to the received text is obtained. This step may be performed as described herein, such as at step 720.

At step 820, a sequence of noise vectors is generated. The noise vectors may be created using any appropriate techniques, such as sampling a noise distribution (e.g., a Gaussian distribution). The sequence of noise vectors may have the size or dimensions corresponding to desired encoded audio vectors. For example, the number of vectors may be larger than the number of encoded audio vectors expected to be needed to generate the speech audio signal. The number of vectors may be determined using any appropriate techniques, such as a formula based on the number and/or types of letters or phonemes in the received text. The length of each noise vector may correspond to the length of an encoded audio vector.

At steps 825 to 835, an iterative process is performed to transform the noise vectors into encoded audio vectors corresponding to the received text.

At step 825, a noise schedule weight is determined. The noise schedule weight may be determined using any appropriate techniques, such as any of the techniques described herein. For example, the noise schedule may be set in advance, and each iteration may select a next noise schedule weight from the noise schedule.

At step 830, a denoising operation is performed to remove noise from an input sequence of encoded-audio vectors to generate an output sequence of encoded-audio vectors. The denoising operation may be implemented using any appropriate techniques, such as any of the techniques described herein. For example, the denoising operation may be implemented using any combination of the techniques described in FIG. 3, FIG. 4, and FIG. 5.

For a first iteration of step 830, the input encoded-audio vectors may correspond to the noise vectors generated at step 820. For later iterations, the input encoded-audio vectors may correspond to the output encoded-audio vectors of the previous iteration. For example, for a first iteration, a first sequence of encoded audio vectors may be computed by processing the sequence of noise vectors, a first noise-schedule weight, and the sequence of byte-encoding vectors. For a second iteration, a second sequence of encoded audio vectors may be computed by processing the first sequence of encoded audio vectors, a second noise-schedule weight, and the sequence of byte-encoding vectors. More iterations may be performed, and for a final iteration, a final sequence of encoded audio vectors may be computed by processing a penultimate sequence of encoded audio vectors (i.e., the previous sequence), a final noise-schedule weight, and the sequence of byte-encoding vectors.

At step 835, it is determined if the removal of noise from the encoded-audio vectors is complete. Any appropriate techniques may be used to determine if the removal of noise is complete, such as determining a convergence criterion has been met or determining that a final iteration of the noise schedule has been performed. If it is not complete, then processing may proceed to step 825 where additional denoising operations are performed. If it is complete, then processing may proceed to step 840.

At step 840, the final output encoded-audio vectors of step 830 are decoded with an audio decoder to generate an audio signal. Step 840 may be performed using appropriate techniques, such as any of the techniques described herein.

At step 845, the audio signal is used in an application, such as a voice user interface application.

Figure 9:
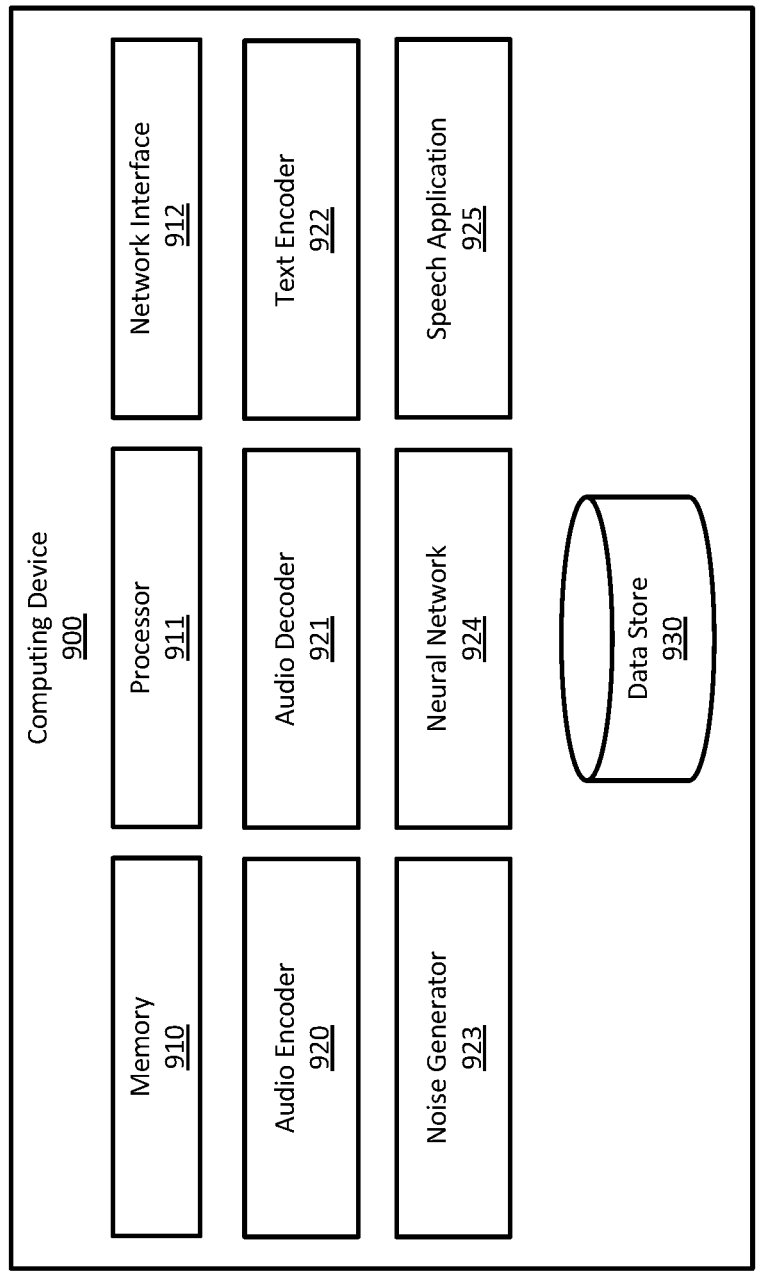
FIG. 9 illustrates components of one implementation of a computing device for implementing any of the techniques described herein.

FIG. 9 illustrates components of one implementation of a computing device 900 for implementing any of the techniques described herein. In FIG. 9, the components are shown as being on a single computing device, but the components may be distributed among multiple computing devices, such as a system of computing devices, including, for example, an end-user computing device (e.g., a smartphone or a tablet) and/or a server computer (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Computing device 900 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 900 may have an audio encoder component 920 that may generate encoded audio vectors from an audio signal using any of the techniques described herein. Computing device 900 may have an audio decoder component 921 that may generate an audio signal from encoded-audio vectors using any of the techniques described herein. Computing device 900 may have a text encoder component 922 that may encode text using any of the techniques described herein. Computing device 900 may have a noise generator component 923 that may generate a sequence of noise vectors using any of the techniques described herein. Computing device 900 may have a neural network component 924 that may perform denoising of encoded-audio vectors using any of the techniques described herein. Computing device 900 may have a speech application component 925 that may use generated speech audio in an application using any of the techniques described herein.

Computing device 900 may include or have access to various data stores. Data stores may use any known storage technology such as files, relational databases, non-relational databases, or any non-transitory computer-readable media. Computing device 900 may have data store 930 that stores any appropriate information for generating speech audio from text, such as a training corpus or any of the other information described herein.

The techniques described herein may also be performed as described in the following paragraphs.

The capabilities of generative models have progressed rapidly across a range of modalities, largely driven by the emergence of simple, end-to-end solutions that require minimal supervision and are highly scalable. Progress in discrete domains such as language has been driven by autoregressive transformers while progress in continuous domains such as images and videos has been increasingly driven by diffusion models.

Audio generation presents challenges for autoregressive methods due to the length of audio waveforms. To overcome this, recent autoregressive approaches use neural audio tokenizers to reduce the sequence length of the audio representation. Despite this, such approaches still use cascades of multiple models that first generate coarse acoustic features and then generate finer details.

Diffusion models are a natural fit for end-to-end text-to-speech generation. Their iterative sampling procedure enables a single model to generate audio in a coarse-to-fine manner, while parallel generation improves their scalability to long sequences. However, recent diffusion text-to-speech models still use additional external components like duration or pitch predictors to provide conditioning for the speech synthesis model, introducing potential performance bottlenecks and increasing system complexity.

A simple, end-to-end text-to-speech diffusion model (called Simple-TTS) is developed that does not require additional trainable components, multi-stage generation pipelines, or specialized tools such as phonemizers or forced aligners. It is found that, with a few critical changes, a recipe that has been effective for text-to-image generation can also be applied to text-to-speech synthesis. First, the U-Audio Transformer (U-AudT) architecture is introduced by modifying the U-Vision Transformer (U-ViT), proposed for high-resolution image synthesis, to handle one-dimensional sequences. Second, it is found that frozen byte-level language models provide an effective conditioning signal for high-fidelity text-to-speech generation. Third, it is found that common diffusion noise schedules are ill-suited, and using a scaled cosine noise schedule is useful for strong text-audio alignment.

It is demonstrated that high-quality speech synthesis is possible with a single unified model trained in an end-to-end manner. A latent diffusion approach outperforms strong open-source baselines requiring duration prediction models while being conceptually simpler than recent TTS diffusion models. Simple-TTS is capable of generating speech using only the transcript at inference time. The viability of end-to-end latent diffusion for text-to-speech synthesis is demonstrated, paving the way for further scaling and improvements of generative speech models.

Diffusion models are latent variable models with latents given by a forward diffusion process, which defines a gradual transition from the data distribution to a Gaussian distribution.

The Markovian forward process iteratively adds Gaussian noise to the data over time. The noise schedule monotonically decreases the signal-to-noise ratio (SNR), as a function of the time, such that the final latent becomes approximately Gaussian. The forward process provides a transition from the data distribution to a Gaussian distribution.

Diffusion models define a generative process by inverting the forward process, defining a transition from Gaussian noise, which can be sampled analytically, to the unknown data distribution. At its core, inverting this process can be reduced to learning a denoising network that reconstructs the clean data given some noisy latent, the time, and (optionally) some conditioning information about the data. This denoising network is trained with a regression objective with a time-dependent weighting term that is typically set empirically to emphasize noise levels that are important for downstream perceptual quality.

This loss function can be motivated as the weighted variational lower bound of the log likelihood of the data under the forward diffusion process. In practice, the denoising network is often parameterized as a noise prediction network or a velocity prediction network. These parameterizations can be interpreted as different weighting functions for the regression objective.

A significant breakthrough in high-resolution image diffusion was the introduction of latent diffusion. Instead of learning diffusion models directly in pixel-space, latent diffusion proposes to instead learn diffusion models in the compact latent space of a pre-trained autoencoder. Samples can then be drawn from the low-dimensional latent space of the autoencoder and decoded to pixel space with the pre-trained decoder. This allows the diffusion model to focus on generating the high-level semantics of images while the task of generating high-frequency details is relegated to the autoencoder.

An important factor that determines downstream sample quality is the noise schedule $\alpha_t$ which influences the weighting placed on different levels of noise during training. The cosine noise schedule, $\alpha_t=\cos(0.5\pi t)$, for image generation has become a common choice across applications and domains.

Similar to recent text-to-speech diffusion models, high-resolution image diffusion models may employ a multi-stage generation pipeline that first generates a low resolution image and then applies sequential super-resolution models. However, common noise schedules such as the cosine noise schedule may be implicitly tuned for low-resolution images. Adjusting the noise schedule may enable learning a single diffusion model for end-to-end high-resolution image synthesis. An existing noise schedule may be shifted or scaled by some scale factor, s, to emphasize training at higher levels of noise.

Given a noise schedule $\alpha_t$ with SNR $$\lambda_t = \frac{\alpha_t^2}{1 - \alpha_t^2},$$

the shifted noise schedule, $\alpha_{t,s} \in [0, 1]$, is defined such that $$\frac{\alpha_{t,s}^2}{1 - \alpha_{t,s}^2} = \lambda_{t,s} = \lambda_t * s^2 = \frac{\alpha_t^2}{1 - \alpha_t^2} * s^2$$

Given $\alpha_t$ and the scale factor s, the new noise schedule $\alpha_{t,s}$, has a closed-form solution. Using the fact that $\alpha_t^2 = \text{sigmoid}(\log(\lambda_t))$, the shifted noise schedule can be computed as $$\alpha_{t,s}^2 = \text{sigmoid}(\log(\lambda_{t,s})) = \text{sigmoid}(\log(\lambda_t * s^2)) = \text{sigmoid}(\log(\lambda_t) + 2\log(s))$$

Shifted cosine noise schedules with different scale factors may be considered. It is observed that using a scale factor s<1 emphasizes training at higher levels of noise, which is helpful for learning an end-to-end text-to-speech diffusion model.

Due to the high dimensionality of raw audio waveforms and the availability of high-quality neural audio codecs, latent diffusion is a natural fit for audio generation. The pre-trained EnCodec model may be used to map raw audio waveforms to a sequence of continuous vectors. EnCodec, like other neural audio codecs such as SoundStream, applies residual vector quantization to map each continuous vector to a variable number of discrete tokens that capture increasingly fine details. The number of quantizers may be adjusted to trade off compression rates and quality.

This quantization stage produces lengthy representations that may be challenging to model. Prior autoregressive approaches, such as AudioLM and Vall-E, deal with this by developing multi-stage pipelines with specialized models for generating tokens from early and late quantizers. Diffusion models, on the other hand, are effective at generating continuous representations directly. As a result, a diffusion model may be trained to generate continuous, pre-quantization representations produced by the EnCodec encoder, reducing the length of the audio representation by a factor of 16. During inference, quantization may then be performed before using the EnCodec decoder to convert the generated latents to raw audio.

For a denoising architecture, the U-Vision Transformer (U-ViT) architecture (originally proposed for high-resolution text-to-image synthesis) may be modified to handle 1D audio sequences. Because the focus is on audio generation, the model is referred to as the U-Audio Transformer (U-AudT), although the architecture is likely generally applicable to 1D sequence generation problems.

The original U-ViT model consists of a U-Net and transformer. The first half of the U-Net downsamples the input to produce low-resolution features that are processed by the transformer. The output of the transformer is then upsampled by the second half of the U-Net to the original resolution to generate the final prediction.

To modify U-ViT for 1D audio, the U-Net design is modified to replace its 2D convolutions with corresponding 1D convolutions. For instance, each 2D convolution kernel of size 3×3 may be substituted with a 1D convolution of size 3. Similar substitutions for the downsampling and upsampling operations may be performed. This change enables the U-Net to handle 1D sequences.

Transformer Architecture. A pre-normalization transformer using RMSNorm and GeGLU activations may be used. Because prior work for audio tasks has found relative positional encodings to be more effective than absolute positional encodings, positional information is encoded with a Dynamic Position Bias (DPB). This introduces a lightweight multi-layer perceptron (MLP) at every self-attention layer that maps relative offsets between locations to per-head bias terms that are added to the pre-softmax self-attention scores.

Noise Conditioning. α-conditioning may be used to condition the network on the level of noise. $\alpha_t$ is mapped to a sinusoidal position embedding and passed through an MLP to obtain a time embedding. Adaptive group normalization layers are used in the residual blocks of the U-Net conditioned on the time embedding. For the transformer model, adaptive RMSNorm is applied before the feedforward layers.

Text Conditioning. The text information may be conditioned similarly to successful text-to-image diffusion models. The frozen representations from the ByT5 encoder are mean pooled and passed through an MLP to generate a global text embedding that is added to the time embedding. Cross-attention layers are also introduced to the transformer model that cross attend to the text representations.

Classifier-Free Guidance. To enable the application of classifier-free guidance, the text may be dropped with probability p=0.1 to jointly train a conditional and unconditional diffusion model. During inference, a sampling parameter, w, may be introduced. When w=1.0, this reduces to the conditional diffusion model, and setting w>1.0 increases the influence of the conditioning information. This technique enables trade off of fidelity with sample diversity and is helpful for the quality of state-of-the-art text-to-image diffusion models.

For the cross-attention layers, a learnable null embedding may be introduced that is concatenated with the text features along the sequence dimension. The conditioning information can be dropped by masking out the text embeddings from the cross-attention mechanism and zeroing out the mean-pooled text embedding.

Recent autoregressive text-to-speech systems can specify the speaker by providing the network with an audio prompt. Diffusion models can also perform speaker-prompted generation by treating it as an inpainting problem which has been widely studied with images. Pre-trained diffusion models can be adapted to solve a variety of inverse problems such as inpainting at inference-time, but such approaches may involve long sampling schedules or backpropagating through a denoising network which may significantly slow down generation. They may also underperform diffusion models trained to solve the inverse tasks directly.

A denoising network may be trained for both zero-shot and speaker-prompted text-to-speech synthesis in a multi-task fashion. Specifically, with probability p=0.5 the network may be trained to perform audio inpainting by concatenating a clean audio snippet with a noisy latent vector. A duration d is sampled and concatenated to the start of the clean audio x[:d] with the end of the noisy latent $z_t$[d:] to construct the input. A binary embedding is introduced to identify corrupted frames, which are summed with the input after the initial projection. When calculating the loss, frames corresponding to the clean snippet are masked out.

For the prompt duration, the proportion of the input, d in [0, 1], may be sampled to hold out as the clean prompt. For instance, if the sample is d=0.1 for a 10 second clip of audio, then the frames corresponding to the first second of audio are used as the clean prompt. A Beta distribution may be used with a mode of 0.01 and a concentration of 5 as a sampling distribution. This parameterization was chosen because it is bounded on the unit interval and has a strong leftward skew towards challenging settings with short prompts. Reasonable alternative distributions would likely be similarly effective.

During inference, the method used by autoregressive TTS models such as VALL-E may be followed and some sample audio and the associated text may be prepended to the input to generate speech that is consistent with the provided sample.

Recent diffusion TTS methods may require training a separate duration prediction model that is used during inference to determine the length of the generated utterance. The generation pipeline may be simplified by having the diffusion model determine the length of the speech during generation. To enable this ability, the audio may be padded with variable-length silence up to a maximum length of 20 seconds during training. To effectively reconstruct the audio representation at high noise levels, the denoising network may learn to estimate the duration of the speech from the transcript and the optional speaker prompt.

During generation, an upper bound may be specified for the length of the speech. The diffusion model may then terminate the speech by generating silence which can be trimmed with an audio utility such as Sox. If a duration prediction is available, it can still be used with the model to accelerate generation, but it is no longer a prerequisite.

It is observed that the standard cosine noise schedule leads to poor alignment between the transcript and the generated speech. Using a scaled cosine noise schedule that emphasizes higher noise levels leads to improvements. To understand this effect, the WER rate of a pre-trained ASR model on resynthesized audio for scaled latents may be examined across time for different noise schedules. For this exploration, HuBERT-L1 pre-trained on 60K hours of Libri-Light and fine-tuned on 960 hours of Librispeech is used.

The performance degrades with increasing levels of noise, but the scale factor controls the rate of degradation. When using the standard cosine noise schedule, for instance, the WER is almost entirely unaffected for t in [0, 0.25]. Because t is sampled in (0, 1) during training, roughly a quarter of the training compute is dedicated to cleaning up highly intelligible speech for which the transcript is redundant and provides little value to the denoising network.

When using a scale factor of s=0.2, however, the speech is only highly intelligible for the final portion of the noise schedule. Decreasing the scale factor, therefore, increases the amount of training time spent at high noise levels where the words are being resolved and the transcript must be used to estimate the original data. During generation, this also dedicates more diffusion steps to resolving the global structure of the speech (duration, word placement, etc.) compared to the standard noise schedule.

It is noted that the HuBERT-L ASR performance is pessimistic compared with a subjective evaluation of the intelligibility of the audio across time. This is unsurprising given the susceptibility of neural networks to out-of-distribution corruptions. The WER values of the corrupted audio should therefore be interpreted as approximate upper bounds rather than precise measurements. This simple evaluation is, however, illustrative of the broad trend that motivates shifting the noise schedule to improve the speech-text alignment of generations. A shifted cosine noise schedule is employed with s=0.2 based on preliminary experiments this choice is explored in ablation studies.

Datasets. The English subset of the Multilingual LibriSpeech (MLS) dataset is used, which consists of 44.5K hours of speech derived from audiobooks from LibriVox2, to train SimpleTTS. This dataset consists of audio from nearly 5,500 speakers which makes it well-suited for developing TTS models capable of synthesizing diverse voices. The primary model is trained for 200 k steps with a batch size of 256 audio clips. It is observed that the model is still improving at the end of training and further quality improvements can likely be obtained with additional training. For evaluation, the widely studied LibriSpeech (LS) dataset is used. To enable direct comparison with prior work, a filtered subset of LS test-clean consisting of clips between four and ten seconds in length is considered.

Baselines. For a strong text-only TTS model, the recently released English MMS model, a single-speaker TTS model utilizing the VITS architecture is considered. For a speaker-prompted TTS model, a comparison is made against YourTSS, a VITS model conditioned on a speech prompt. Because recent generative speech models reporting state-of-the-art performance such as AudioLM, Vall-E, and VoiceBox are not publicly available, their reported evaluation setting is followed and a comparison is made directly against their reported numbers.

Metrics. To evaluate the intelligibility of the synthesized audio, the speech is transcribed with a pre-trained ASR model and the WER is computed between the transcribed text and original transcript. The same HuBERT-L model employed by prior work is used to enable direct comparison.

For speaker-prompted TTS, the similarity between the prompt and synthesized speech is evaluated by using a pre-trained speaker verification model. Speaker embeddings are extracted for the prompt and synthesized speech and the cosine similarity between the embeddings is reported.

The results demonstrate that the method can generate high-fidelity, intelligible speech from text in a zero-shot setting, matching the word error rate (WER) of the ground truth. Notably, the zero-shot WER surpasses that of the recently released single-speaker MMS model despite the model's additional capability for multi-speaker synthesis. The strong zero-shot performance indicates the multi-task training approach, alternating between corrupted and clean latents, enables the model to synthesize natural speech from text alone.

When provided a three second speaker prompt, the model also generates high quality speaker-prompted speech, with lower WER than VALL-E and YourTTS. However, it does not match the WER of VoiceBox, which requires phoneme duration annotations for generation. For speaker similarity, the model outperforms YourTTS but lags behind VALL-E and VoiceBox.

In this work, a simple end-to-end solution for text-to-speech synthesis is developed that does not require multiple trainable components, multi-stage generation pipelines, or specialized tools such as phonemizers or forced aligners.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method for generating an audio signal from text, comprising:
   receiving the text;
   computing a sequence of byte-encoding vectors from the text;
   computing a sequence of noise vectors;
   computing a first sequence of encoded audio vectors by processing the sequence of noise vectors, the sequence of byte-encoding vectors, and a first noise-schedule weight with a neural network;
   computing a second sequence of encoded audio vectors by processing the first sequence of encoded audio vectors, the sequence of byte-encoding vectors, and a second noise-schedule weight with the neural network;
   computing a final sequence of encoded audio vectors by processing a penultimate sequence of encoded audio vectors, the sequence of byte-encoding vectors, and a final noise-schedule weight with the neural network; and
   computing the audio signal by processing the final sequence of encoded audio vectors with an audio decoder.

2. The computer-implemented method of claim 1, wherein the neural network comprises:
   a residual block layer;
   a downsampling layer;
   a transformer layer; and
   an upsampling layer.

3. The computer-implemented method of claim 2, wherein the transformer layer comprises a cross-attention layer for processing the sequence of byte-encoding vectors.

4. The computer-implemented method of claim 1, wherein the first noise-schedule weight, the second noise-schedule weight, and the final noise-schedule weight are selected from a noise schedule.

5. The computer-implemented method of claim 4, wherein the noise schedule is a scaled noise schedule.

6. The computer-implemented method of claim 5, wherein the scaled noise schedule is computed using a sigmoid function.

7. The computer-implemented method of claim 5, wherein the scaled noise schedule is a cosine noise schedule.

8. A system, comprising at least one server computer comprising at least one processor and at least one memory, the at least one server computer configured to:
   receive text;
   compute a sequence of byte-encoding vectors from the text;
   compute a sequence of noise vectors;
   compute a first sequence of encoded audio vectors by processing the sequence of noise vectors, the sequence of byte-encoding vectors, and a first noise-schedule weight with a neural network;
   compute a second sequence of encoded audio vectors by processing the first sequence of encoded audio vectors, the sequence of byte-encoding vectors, and a second noise-schedule weight with the neural network;
   compute a final sequence of encoded audio vectors by processing a penultimate sequence of encoded audio vectors, the sequence of byte-encoding vectors, and a final noise-schedule weight with the neural network; and
   compute an audio signal by processing the final sequence of encoded audio vectors with an audio decoder.

9. The system of claim 8, wherein the neural network comprises a cross-attention layer for processing the sequence of byte-encoding vectors.

10. The system of claim 8, wherein the sequence of byte-encoding vectors are computed using embeddings of bytes corresponding to the text.

11. The system of claim 8, wherein the at least one server computer is configured to:
    receive a sequence of prompt encoded-audio vectors; and
    compute the first sequence of encoded audio vectors by processing the sequence of prompt encoded-audio vectors with the neural network;
    wherein:
      the text comprises prompt text and target text, and
      the prompt text corresponds the sequence of prompt encoded-audio vectors.

12. The system of claim 11, wherein the at least one server computer is configured to remove a portion of the audio signal corresponding to the sequence of prompt encoded-audio vectors.

13. The system of claim 8, wherein the at least one server computer is configured to:
    determine an audio signal length; and
    generate the sequence of noise vectors using the audio signal length.

14. The system of claim 8, wherein the neural network comprises:
    a contracting path, wherein the contracting path comprises a first residual block layer and an downsampling layer;
    a transformer layer; and
    an expanding path, wherein the expanding path comprises a second residual block layer and an upsampling layer.

15. One or more non-transitory, computer-readable media comprising computer-executable instructions that, when executed, cause at least one processor to perform actions comprising:
    receiving text;
    computing a sequence of byte-encoding vectors from the text;

computing a sequence of noise vectors;
computing a first sequence of encoded audio vectors by processing the sequence of noise vectors, the sequence of byte-encoding vectors, and a first noise-schedule weight with a neural network;
computing a second sequence of encoded audio vectors by processing the first sequence of encoded audio vectors, the sequence of byte-encoding vectors, and a second noise-schedule weight with the neural network;
computing a final sequence of encoded audio vectors by processing a penultimate sequence of encoded audio vectors, the sequence of byte-encoding vectors, and a final noise-schedule weight with the neural network; and
computing an audio signal by processing the final sequence of encoded audio vectors with an audio decoder.

16. The one or more non-transitory, computer-readable media of claim 15, wherein the sequence of byte-encoding vectors are computed using UTF-8 bytes corresponding to the text.

17. The one or more non-transitory, computer-readable media of claim 15, wherein computing the first sequence of encoded audio vectors comprises:
computing a sequence of contracted vectors by processing the sequence of noise vectors, the sequence of byte-encoding vectors, and the first noise-schedule weight with a contracting path, wherein the contracting path comprises a first convolutional neural network layer and a downsampling layer;
computing a sequence of transformed contracted vectors by processing the sequence of contracted vectors, the sequence of byte-encoding vectors, and the first noise-schedule weight with a transformer block; and
computing a sequence of expanded vectors by processing the sequence of transformed contracted vectors, the sequence of byte-encoding vectors, and the first noise-schedule weight with an expanding path, wherein the expanding path comprises a second convolutional neural network layer and an upsampling layer.

18. The one or more non-transitory, computer-readable media of claim 15, wherein computing the sequence of noise vectors comprises sampling a Gaussian noise distribution.

19. The one or more non-transitory, computer-readable media of claim 15, wherein the neural network operates to reverse a diffusion process.

20. The one or more non-transitory, computer-readable media of claim 15, wherein the sequence of byte-encoding vectors provide information about semantic meaning of the text in context.

* * * * *